US008298655B2

(12) United States Patent
Kalkanoglu et al.

(10) Patent No.: US 8,298,655 B2
(45) Date of Patent: *Oct. 30, 2012

(54) SOLAR HEAT RESPONSIVE EXTERIOR SURFACE COVERING

(75) Inventors: Husnu M. Kalkanoglu, Swarthmore, PA (US); Ming Liang Shiao, Collegeville, PA (US); Keith C. Hong, Northborough, MA (US); Gregory F. Jacobs, Oreland, PA (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/157,715

(22) Filed: Jun. 10, 2011

(65) Prior Publication Data

US 2011/0235153 A1 Sep. 29, 2011

Related U.S. Application Data

(63) Continuation of application No. 12/782,329, filed on May 18, 2010, now Pat. No. 8,017,224, which is a continuation of application No. 11/456,112, filed on Jul. 7, 2006, now Pat. No. 7,749,593.

(51) Int. Cl.
*B32B 7/02* (2006.01)

(52) U.S. Cl. ........ 428/220; 428/212; 428/457; 359/267; 359/275; 359/288

(58) Field of Classification Search ................ 428/212, 428/220, 457; 359/267, 275, 288
See application file for complete search history.

(56) References Cited

U.S. PATENT DOCUMENTS

| | | | |
|---|---|---|---|
| 2,379,358 A | 6/1945 | Jewett | |
| 2,591,149 A | 4/1952 | Grove | |
| 2,614,051 A | 10/1952 | Buzzell et al. | |
| 2,732,311 A | 1/1956 | Hartwright | |
| 2,898,232 A | 8/1959 | Miller et al. | |
| 2,927,045 A | 3/1960 | Lodge et al. | |
| 2,963,378 A | 12/1960 | Palmquist et al. | |
| 2,981,636 A | 4/1961 | Lodge et al. | |
| 3,255,031 A | 6/1966 | Lodge et al. | |
| 3,507,676 A | 4/1970 | McMahon | |
| 4,038,239 A | 7/1977 | Coyner et al. | |
| 4,092,441 A | 5/1978 | Meyer et al. | |
| 4,218,502 A | 8/1980 | Graham et al. | |
| 4,287,248 A | 9/1981 | Gessner et al. | |
| 4,378,408 A | 3/1983 | Joedicke | |
| 4,583,486 A | 4/1986 | Miller | |
| 4,708,812 A | 11/1987 | Hatfield | |
| 4,717,614 A | 1/1988 | Bondoc et al. | |
| 4,916,014 A | 4/1990 | Weber et al. | |
| 5,000,999 A | 3/1991 | Hollander | |
| 5,194,113 A | 3/1993 | Lasch et al. | |
| 5,240,760 A | 8/1993 | George et al. | |
| 5,310,803 A | 5/1994 | Hansen | |
| 5,356,664 A | 10/1994 | Narayan et al. | |
| 5,380,552 A | 1/1995 | George et al. | |
| 5,411,803 A | 5/1995 | George et al. | |
| 5,427,793 A | 6/1995 | Bigham et al. | |
| 5,456,785 A | 10/1995 | Venable | |
| 5,484,477 A | 1/1996 | George et al. | |
| 5,514,350 A | 5/1996 | Kear et al. | |
| 5,516,573 A | 5/1996 | George et al. | |
| 5,541,350 A | 7/1996 | Murata et al. | |
| 5,571,596 A | 11/1996 | Johnson | |
| 5,573,782 A | 11/1996 | Bigham et al. | |
| 5,595,813 A | 1/1997 | Ogawa et al. | |
| 5,620,554 A | 4/1997 | Venable | |
| 5,643,399 A | 7/1997 | Venable | |
| 5,723,516 A | 3/1998 | Bigham et al. | |
| 5,731,369 A | 3/1998 | Mahoney | |
| 5,770,295 A | 6/1998 | Alderman | |
| 5,783,506 A | 7/1998 | Eppler et al. | |
| 5,795,389 A | 8/1998 | Koschitzky | |
| 5,840,111 A | 11/1998 | Wiederhoft et al. | |
| 5,876,683 A | 3/1999 | Glumac et al. | |
| 5,928,761 A | 7/1999 | Hedblom et al. | |
| 5,962,143 A | 10/1999 | Krauthauser et al. | |
| 6,037,289 A | 3/2000 | Chopin et al. | |
| 6,063,312 A | 5/2000 | Mannheimer | |
| 6,124,466 A | 9/2000 | Matsuno et al. | |
| 6,143,318 A | 11/2000 | Gilchrist et al. | |
| 6,156,245 A | 12/2000 | Takebayashi et al. | |
| 6,174,360 B1 | 1/2001 | Sliwinski et al. | |
| 6,214,466 B1 | 4/2001 | Joedicke | |
| 6,217,252 B1 | 4/2001 | Tolliver et al. | |
| 6,245,381 B1 | 6/2001 | Israel | |

(Continued)

FOREIGN PATENT DOCUMENTS

EP 0003302 A 8/1997

(Continued)

OTHER PUBLICATIONS

Adobe Systems Inc., Technical Guides "Color Models, CIELAB," 2 pgs., 2000.
Adobe Systems Inc., Technical Guides "Color Models, The CIE Color Models," 2 pgs., 2000.
Adobe Systems Inc., Technical Guides "Color Models, CIEXYZ," 2 Pgs., 2000.
Adobe System Inc., Technical Guides "Color Models, The Munsell Color System," 4 pgs., 2000.
BASF Aktiengesellschaft, "Product Specification, SIXOLUX Metal Gloss L 6015," 1 pg., Sep. 18, 2002.
BASF Akitengessellschaft, "Product Specification, SIXOLUX Copper Gloss L 3015," 1 pg., Sep. 18, 2002.
BASF Corporation, "BASF launches two new pigments for tile coatings," 1 pg., 1998-2003.

(Continued)

*Primary Examiner* — Maria Veronica Ewald
*Assistant Examiner* — Lawrence Ferguson
(74) *Attorney, Agent, or Firm* — Paul & Paul

(57) ABSTRACT

An exterior surface covering has a colored outer layer that transmits infrared radiation and an inner layer with a thermochromic pigment that absorbs heat at low temperature and reflects at high temperatures. The outer layer conceals the color change of the thermochromic pigment.

6 Claims, 2 Drawing Sheets

U.S. PATENT DOCUMENTS

| | | | |
|---|---|---|---|
| 6,245,850 B1 | 6/2001 | Fields | |
| 6,296,912 B1 | 10/2001 | Zickell | |
| 6,355,309 B1 | 3/2002 | Fleming et al. | |
| 6,362,121 B1 | 3/2002 | Chopin et al. | |
| 6,366,397 B1 | 4/2002 | Genjima et al. | |
| 6,376,075 B1 | 4/2002 | Tacke-Willemsen et al. | |
| 6,426,309 B1 | 7/2002 | Miller et al. | |
| 6,446,402 B1 | 9/2002 | Byker et al. | |
| 6,451,874 B1 | 9/2002 | Purgett et al. | |
| 6,454,848 B2 | 9/2002 | Sliwinski et al. | |
| 6,465,088 B1 | 10/2002 | Talpaert et al. | |
| 6,500,555 B1 | 12/2002 | Khaldi | |
| 6,502,360 B2 | 1/2003 | Carr, III et al. | |
| 6,521,038 B2 | 2/2003 | Yanagimoto et al. | |
| 6,531,200 B2 | 3/2003 | Zickell et al. | |
| 6,533,961 B2 | 3/2003 | Harelstad et al. | |
| 6,537,703 B2 | 3/2003 | DuPasquier et al. | |
| 6,548,145 B2 | 4/2003 | Joedicke | |
| 6,569,520 B1 | 5/2003 | Jacobs | |
| 6,572,784 B1 | 6/2003 | Coombs et al. | |
| 6,596,070 B1 | 7/2003 | Schmidt et al. | |
| 6,599,355 B1 | 7/2003 | Schmidt et al. | |
| 6,607,781 B2 | 8/2003 | Joedicke | |
| 6,610,135 B1 | 8/2003 | Ohmori et al. | |
| 6,610,147 B2 | 8/2003 | Aschenbeck | |
| 6,647,688 B1 | 11/2003 | Gaitan et al. | |
| 6,653,356 B2 | 11/2003 | Sherman | |
| 6,680,134 B2 | 1/2004 | Maurer et al. | |
| 6,692,824 B2 | 2/2004 | Benz et al. | |
| 6,703,127 B2 | 3/2004 | Davis et al. | |
| 6,797,277 B2 | 9/2004 | Heier et al. | |
| 6,861,145 B2 | 3/2005 | Nastke et al. | |
| 6,881,702 B2 | 4/2005 | Arnold et al. | |
| 6,905,698 B1 | 6/2005 | Aldcroft et al. | |
| 6,933,007 B2 | 8/2005 | Fensel et al. | |
| 7,132,143 B2 | 11/2006 | Zanchetta et al. | |
| 7,176,245 B2 | 2/2007 | Stucky et al. | |
| 7,238,408 B2 | 7/2007 | Aschenbeck et al. | |
| 7,749,593 B2 * | 7/2010 | Kalkanoglu et al. | 428/212 |
| 8,017,224 B2 * | 9/2011 | Kalkanoglu et al. | 428/212 |
| 2002/0092596 A1 | 7/2002 | Phillips et al. | |
| 2002/0160151 A1 | 10/2002 | Pinault et al. | |
| 2003/0035972 A1 | 2/2003 | Hanson et al. | |
| 2003/0044525 A1 | 3/2003 | Aschenbeck | |
| 2003/0068469 A1 | 4/2003 | Aschenbeck et al. | |
| 2003/0091795 A1 | 5/2003 | Kiik et al. | |
| 2003/0091814 A1 | 5/2003 | Benz et al. | |
| 2003/0152747 A1 | 8/2003 | Fensel et al. | |
| 2003/0203145 A1 | 10/2003 | Zanchetta et al. | |
| 2003/0219563 A1 | 11/2003 | Zanchetta et al. | |
| 2004/0076826 A1 | 4/2004 | Lee | |
| 2004/0110639 A1 | 6/2004 | Joedicke | |
| 2004/0170806 A1 | 9/2004 | Hittle et al. | |
| 2004/0255548 A1 | 12/2004 | Hong et al. | |
| 2004/0258835 A1 | 12/2004 | Hong et al. | |
| 2005/0053745 A1 | 3/2005 | Bartek et al. | |
| 2005/0053746 A1 | 3/2005 | Bartek | |
| 2005/0064175 A1 | 3/2005 | Azari et al. | |
| 2005/0072110 A1 | 4/2005 | Shiao et al. | |
| 2005/0072114 A1 | 4/2005 | Shiao et al. | |
| 2006/0110996 A1 | 5/2006 | Getlichermann et al. | |
| 2006/0243388 A1 | 11/2006 | Kubiak et al. | |
| 2006/0251807 A1 | 11/2006 | Hong et al. | |

FOREIGN PATENT DOCUMENTS

| | | |
|---|---|---|
| GB | 1214816 A | 2/1970 |
| JP | 61176501 A | 8/1986 |
| JP | 2004162482 | 6/2004 |
| WO | 9423580 A | 10/1994 |
| WO | 0011949 A | 3/2000 |

OTHER PUBLICATIONS

Ferro Corporation, "Cool Colors & Eclipse Heat and Energy Saving Pigments," 2 pgs., 1999-2003.

Ferro Corporation, "How Cool Colors & Eclipse Work," 3 pgs., 2003.

G. Beestman, "Microencapsulation of Solid Particles," (H. B. Scher, Ed., Marcel Dekker, Inc., pp. 31-54 New York).

Gaco Western Inc., "Solar Reflectivity of Common Roofing Materials and GACOFlex Roof Coatings," 2 pgs., undated.

Gifty Osel-Premple, et al, "Synthesis and Application of Fluorocarbon Functionalized Mesoporous Silica" Materkals Engineering and Sciences Division # 574, 2006.

H. Akabari, "Cool Colored Materials for Roofs," Lawrence Radiation Laboratory, presented at Emerging Technologies in Energy Efficiency-Summer 2004, San Francisco, Oct. 14, 2004.

L. Sung, et al, "Characterization of Coating Microstructure Using Laser Scanning Confocal Microscopy," Polymer Materials, Science and Engineering, 83, 242-244, 2000.

L. Sung, et al., "Characterization of Coating Microstructure Using Laser Scanning Confocal Microscopy," undated.

Ming-Zhi, et al., "A novel fabrication of meso-porous silica film by sol-gel of TEOS," Journal of Zhejiang University Science, 422-427.

Project Advisory Committee Meeting, "Development of Cool Colored Roofing Materials," Oak Ridge National Laboratory and Livermore Berkeley National Laboratory, 55 pgs., Mar. 11, 2003.

Qingyuan Hu, "Synthesis and Characterization of Functionalized Mesoporous Silica by Aerosol-Assisted Self-Assembly," Chemical & Biomelocular Engineering, # 574 2006.

Rhonda Stroud, "Silica as Nanoglue," Naval Research Laboratory, American Physical Society, Mar. 2000.

Silberline Manufacturing Co., Inc., "StarBrite," 1 pg., 2003.

T. A. Germer, et al., "Modeling the appearance of special effect pigment coatings," Surface Scattering and Diffraction for Advance Metrology, Proc., SPIE 4447, 77-96, 2001.

Y. Jiang, et al. "Novel Pigment Approaches in Optically Variable Security Inks Including Polarizing Cholesteric Liquid Crystal (CLC) Polymers," Optical Security and Counterfeit Deterrence Techniques IV, SPIE 4677, 2000.

* cited by examiner

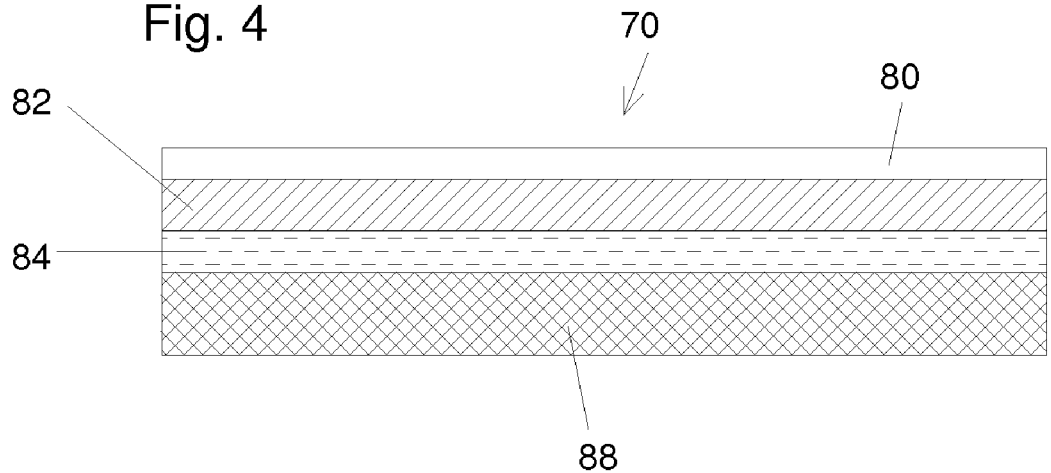

SOLAR HEAT RESPONSIVE EXTERIOR SURFACE COVERING

CROSS-REFERENCE TO RELATED APPLICATIONS

This application is a continuation of pending U.S. patent application Ser. No. 12/782,329, filed on May 18, 2010; which is a continuation of U.S. patent application Ser. No. 11/456,112 filed on Jul. 7, 2006, now U.S. Pat. No. 7,749,593.

BACKGROUND OF THE INVENTION

1. Field of the Invention

The present invention relates to surface coverings such as coatings for exterior building materials such as exterior cladding including siding material, roofing shingles, roofing membranes, and the like.

2. Brief Description of the Prior Art

It is well known that surfaces with dark colors will absorb significant amounts of solar heat from solar radiation, while light or white colors will reflect more solar radiation and hence produce lower surface temperatures under the sun. This is particularly true for a building envelope or building claddings, such as roofing and siding materials. In this case darker colors can absorb significant amount of solar heat and thus increase the energy required for cooling the interior during hot seasons.

Reduced energy consumption is an important national goal. For example, the State of California has a code requirement that all commercial roofing materials in low-slope applications need to exceed a minimum of 70% solar reflectance in order to meet California's energy budget code. Also, in order to qualify as Energy Star® roofing material, a roofing membrane needs to exceed 65% solar reflectance.

To reduce the solar heat build-up at exposed building surfaces or roofing assemblies, one may consider using light colors, or the so-called "cool coloring technology" with reflective properties in the near infrared of solar radiation to reduce solar heat absorption. However, such solutions will result in energy penalty during cold seasons, where heating energy demand can be increased due to loss of solar heat absorption. While in some climates, such as southern California, solar heat resistance is the prime if not exclusive consideration, in most of the United States there is a significant energy demand for heating during much of the year.

Thus, it is advantageous to have a colored surface that can not only provide aesthetic values to a structure, but also optimize the solar energy absorption/reflection in order to maximize whole building energy efficiency by adjusting its solar reflectance in response to the change of surrounding temperatures.

This problem has been addressed by using thermochromatic or thermochromic colorants that can change from dark to light colors as surface temperature changes.

For example, U.S. Pat. No. 5,571,596 discloses a roofing shingle which preferably includes a topcoat of a thermochromatic pigmented paint which changes color with temperature, lightening in strong sunlight to reflect heat and darkening during cool shady days to absorb heat. U.S. Pat. No. 6,500,555 discloses thermochromic laminates for use in roofing and siding to control the temperature of an underlying structure. U.S. Patent Application Publication No. 2005/0064175 discloses microencapsulated thermomorphic materials that can be applied to roofs in situ or to the exterior surfaces of shingles, as well as electorphoretic panels that can be applied over existing roofs to achieve a controllable color change. However, thermochromatic colorants can result in color change of the surfaces. Such color changes may not be desirable for exposed building surfaces where aesthetic appearance is important. U.S. Pat. No. 6,647,688 discloses providing a luminescent material in vinyl siding or trim so that the siding or trim may absorb light during the daytime and glow at night.

Depending on local temperature fluctuations, a surface covered with a substance containing a thermochromic pigment may experience color variation that the consumer may find very objectionable. Also, it is known that thermochromatic colorants are generally not sufficiently lightfast for use in applications subject to outdoor weathering exposure.

Other approaches to building temperature control include systems with retractable film or textiles mounted to the rooftop or claddings to manage the solar heat absorption in order to maximize building energy consumption during hot/cold seasons.

In other systems, water circulation or water evaporation have been used to control the surface temperature of exterior structures.

U.S. Pat. No. 6,446,402 discloses thermochromic window materials that substantially block solar radiation when the ambient temperature is high and allow sunlight to enter when the ambient temperature is low.

There is a continuing need for exterior surfacing material such as roofing materials that have improved solar reflectance while providing and maintaining an attractive appearance. Further, there is a continuing need for surfacing materials that contribute to energy saving in both the cooling season and the heating season.

SUMMARY OF THE INVENTION

The present invention provides a surface covering having controllable solar heat absorption and reflection properties.

The surface covering is useful as a part of roofing or building cladding components, siding or other covering, and in fencing, decking and railing applications, as well. It can also be employed as a surface covering for roofing granules included in roofing shingles. Further, the surface covering of the present invention can be employed in other applications where control of heat buildup due to absorption or reflection of solar radiation is desired, such as, for example, automotive or aerospace coatings.

The present invention also provides a method of making a surface covering having controllable solar heat absorption and reflection properties.

Further, the present invention also provides methods and systems for controlling solar heat absorption and reflection properties of a substrate subject to incident solar radiation.

The present invention provides an exterior surface covering such as a coating comprising an outer layer having a transmission coefficient of at least 50 percent for electromagnetic radiation in the wavelength rage from 700 nanometers to 2500 nanometers, and an inner layer having a reflectance for electromagnetic radiation in the wavelength range from 700 nanometers to 2500 nanometers. The outer layer of the exterior surface covering is preferably colored, for example, to achieve a desired aesthetic effect. The reflectance of the inner layer is dependent on a variable parameter, and varying by a factor of at least 0.5 as the parameter is varied over a predetermined range. In one aspect of the present invention, the reflectance increases with an increase in the parameter over the predetermined range of the parameter. In another aspect of the present invention, the reflectance increases with a decrease in the parameter over the predetermined range of the parameter.

In one presently preferred embodiment of the present invention, the variable parameter is temperature. In this case, it is preferred that the reflectance increase as the temperature increases. Preferably, the reflectance varies from less than 0.2 to greater than 0.25 when the temperature varies from less than 20 degrees C. to greater than 30 degrees C.

Preferably, the inner layer comprises at least one thermochromic substance.

In the various embodiments of the present invention, when an at least one thermochromic substance is included in a specific layer, it is preferred that the at least one thermochromic substance be selected from the group consisting of thermochromatic colorants, thermochromatic polymers, composite thermochromatic pigments, chromogenic thermotropic gels, vanadium oxides, polythiophene polymers, liquid crystals, spirobenzopyrans, spironaphthoxazines, chromenes, fulgides, and diarylethenes.

In another aspect of the present invention, the variable parameter is the strength of an applied electric field and the inner layer comprises an electrochromic substance. In this case, it is preferred that the reflectance vary from less than 0.2 to greater than 0.25 when the strength of the applied electric field exceeds a predetermined field strength.

In a second embodiment, the present invention provides an exterior surface covering comprising three layers. In this embodiment, the exterior surface covering includes an outer colored layer having a transmission coefficient of at least 50 percent for electromagnetic radiation in the wavelength rage from 700 nanometers to 2500 nanometers. In addition, the exterior surface covering comprises a middle layer having a transmission coefficient for electromagnetic radiation in the wavelength range from 700 nanometers to 2500 nanometers, with the transmission coefficient being dependent on a variable parameter, and the transmission coefficient varying by a factor of at least 0.5 as the parameter is varied over a predetermined range. The exterior surface covering also includes an inner layer having a reflectance of at least 40 percent for electromagnetic radiation in the wavelength range from 700 nanometers to 2500 nanometers. In one aspect of this embodiment, it is preferred that the transmission coefficient of the middle layer increases with an increase in the parameter over the predetermined range of the parameter. In another aspect of this embodiment of the present invention, it is preferred that the transmission coefficient of the middle layer increases with a decrease in the parameter over the predetermined range of the parameter.

In a presently preferred embodiment, the variable parameter is temperature. Preferably, the transmission coefficient of the middle layer varies from less than 0.4 to greater than 0.5 when the temperature varies from less than 20 degrees C. to greater than 30 degrees C.

In this embodiment of the present invention, it is preferred that the middle layer comprises at least one thermochromic substance.

In another aspect of this embodiment of the present invention, it is preferred that the variable parameter is the strength of an applied electric field and the middle layer comprises an electrochromic substance. In this embodiment, it is preferred that the transmission coefficient of the middle layer vary from less than 0.4 to greater than 0.5 when the strength of the applied electric field exceeds a predetermined electric field strength.

In a third embodiment, the present invention provides an exterior surface covering including three layers, which include an outer colored layer having a transmission coefficient of at least 50 percent for electromagnetic radiation in the wavelength rage from 700 nanometers to 2500 nanometers, as well as a middle layer having a transmission coefficient for electromagnetic radiation in the wavelength range from 700 nanometers to 2500 nanometers, the transmission coefficient being dependent on a variable parameter, and the transmission coefficient varying by a factor of at least 0.5 as the parameter is varied over a predetermined range. In addition, this embodiment of the present invention includes an inner layer having an absorption coefficient at least 60 percent for electromagnetic radiation in the wavelength range from 700 nanometers to 2500 nanometers. In one aspect of this embodiment, it is preferred that the transmission coefficient of the middle layer increases with an increase in the parameter over the predetermined range of the parameter. In another aspect of this embodiment of the present invention, it is preferred that the transmission coefficient of the middle layer increases with a decrease in the parameter over the predetermined range of the parameter.

In a presently preferred embodiment, the variable parameter is temperature. Preferably, the transmission coefficient of the middle layer varies from less than 0.4 to greater than 0.5 when the temperature varies from less than 20 degrees C. to greater than 30 degrees C.

In this embodiment of the present invention, it is preferred that the middle layer comprises at least one thermochromic substance.

In another aspect of this third embodiment of the present invention, it is preferred that the variable parameter is the strength of an applied electric field and the middle layer comprises an electrochromic substance. In this embodiment, it is preferred that the transmission coefficient of the middle layer vary from less than 0.4 to greater than 0.5 when the strength of the applied electric field exceeds a predetermined electric field strength.

In a fourth embodiment, the present invention provides an exterior surface coating including an outer layer having a transmission coefficient of at least 50 percent for electromagnetic radiation in the wavelength rage from 700 nanometers to 2500 nanometers, as well as a middle layer having a transmission coefficient for electromagnetic radiation in the wavelength range from 700 nanometers to 2500 nanometers, the transmission coefficient being dependent on a first variable parameter, the transmission coefficient varying by a factor of at least 0.5 as the first variable parameter is varied over a predetermined range. The present embodiment also includes an inner layer having an absorption coefficient for electromagnetic radiation in the wavelength range from 700 nanometers to 2500 nanometers, the absorption coefficient being dependent on a second variable parameter, and the absorption coefficient varying by a factor of at least 0.5 as the second variable parameter is varied over a predetermined range.

In one presently preferred embodiment, the surface covering of the present invention comprises at least two coating layers, applied to a substrate as fluid coating compositions, to provide an exterior surface coating to the substrate. In another presently preferred embodiment, the surface covering of the present invention comprises a covering material comprising a first film layer, and at least one additional layer formed from a second film layer laminated to the first film layer, or at least one additional layer formed from a coating composition.

In another aspect, the present invention provides roofing granules coated with an exterior surface coating according to the present invention. In another aspect, the present invention provides asphalt shingles with an exterior surface coated with an exterior surface coating according to the present invention.

In yet another aspect, the present invention provides a bituminous sheet-roofing product with an exterior surface covering according to the present invention. In a further aspect, the present invention provides wall cladding such as polymeric siding material, for example, polyvinyl chloride, polypropylene, or the like, or fiber cement siding with an exterior surface covering according to the present invention.

BRIEF DESCRIPTION OF THE DRAWINGS

FIG. 4 is a schematic sectional elevational view of a fourth embodiment of an exterior surface covering according to the present invention.

DETAILED DESCRIPTION

By employing the surface covering of the present invention, the solar heat absorption of a surface, such as, for example, a building envelope, can be optimized for better energy efficiency during heating/cooling seasons by changing its solar reflectance in the NIR radiation range in response to surrounding temperature or weather changes without affecting its surface color.

This objective can be achieved, for example, by the combination of a color topcoat that allows the majority of solar radiation in the near infrared range to pass through, and a second layer that changes its solar reflectance in response to surrounding temperatures or other weather-related stimuli.

Figure 1:
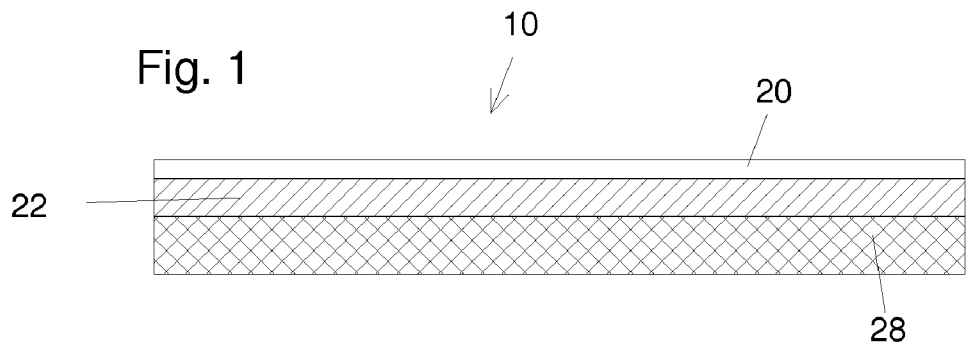
FIG. 1 is a schematic sectional elevational view of a first embodiment of an exterior surface covering according to the present invention.

Referring now to the figures in which like reference numerals represent like elements in each of the several views, there is shown in FIG. 1 a schematic sectional elevational view of a first embodiment of an exterior surface covering 10 according to the present invention. The exterior surface covering 10 is applied over a substrate 28 and comprises an outer layer 20 of a protective topcoat and an inner thermochromatic or thermochromic layer 22 between the outer layer 20 and the substrate 28.

The topcoat or outer layer 20 is transmissive to near infrared radiation and has a desirable apparent color due to absorption and reflection in the visible spectrum. The inner layer 22 changes color with temperature. At lower temperatures, below a first temperature $T_1$, the inner layer 22 may absorb at least a portion of the incident infrared radiation as heat, and may transmit at least a portion of the incident infrared radiation to the substrate 28 to be absorbed by the substrate 28. However, at such lower temperatures, the inner layer 22 has a low reflectance for near infrared radiation.

At higher temperatures, above a second temperature $T_2$, the inner layer 22 changes color so that its reflectance increases in the near infrared region, and the inner layer 22 acts to reflect heat transmitted through the topcoat or outer layer 20 back through the topcoat 20 and away from the underlying substrate 28.

When the inner layer 22 changes its color or reflectance properties, the outwardly visible topcoat 20 maintains the appearance of the coated subject such that the change is not objectionably visibly discernible.

Figure 2:
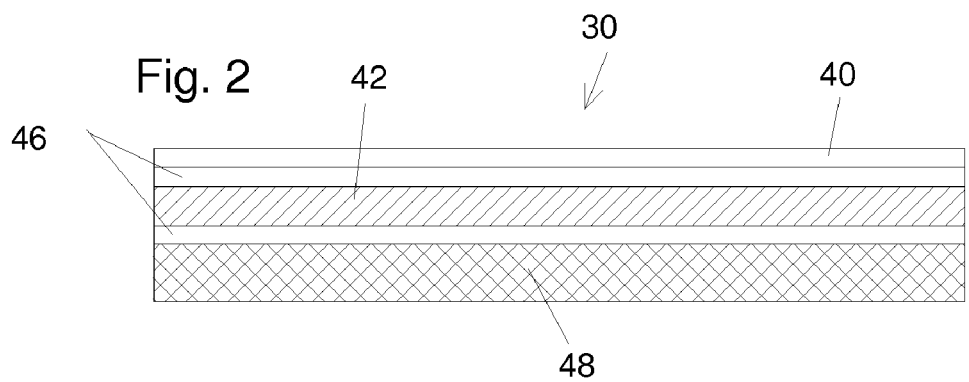
FIG. 2 is a schematic sectional elevational view of a second embodiment of an exterior surface covering according to the present invention.

A schematic sectional elevational view of a second embodiment of an exterior surface covering 30 according to the present invention is provided in FIG. 2. The exterior surface covering 30 of this embodiment also includes an outer or top layer 40, and an inner layer 42. In this embodiment, the inner layer 42 exhibits a change in color or transmissivity. However, in this exterior surface coating 30 the inner layer 42 is an electrochromic layer rather than a thermochromic layer as in the case of the exterior surface covering 10 of the first embodiment.

In this second embodiment, a pair of thin films 46 of an electrochromic polymer bracket the inner layer 42. These films 46 serve as electrodes for applying an electric field to the inner layer 42. Suitable means for generating, applying and controlling an electrical potential are provided (not shown) and connected to the thin films 46. One film 46 is interposed between the upper layer or topcoat 40 and the inner layer 42, while a second film 46 is interposed between the inner layer 42 and the substrate 48. The inner layer 42 has either absorptive or reflective properties, depending whether an electric filed of a predetermined strength is being applied. In one embodiment, when an electrical field of a predetermined field strength is applied, the inner layer 42 is transparent to infrared radiation, thus allowing heat to reach the substrate 48 to be absorbed or reflected, depending on the nature of the substrate 48. When the electric field is removed, the inner layer 42 changes to an opaque layer 42 that can absorb or reflect the heat depending on its composition.

Figure 3:
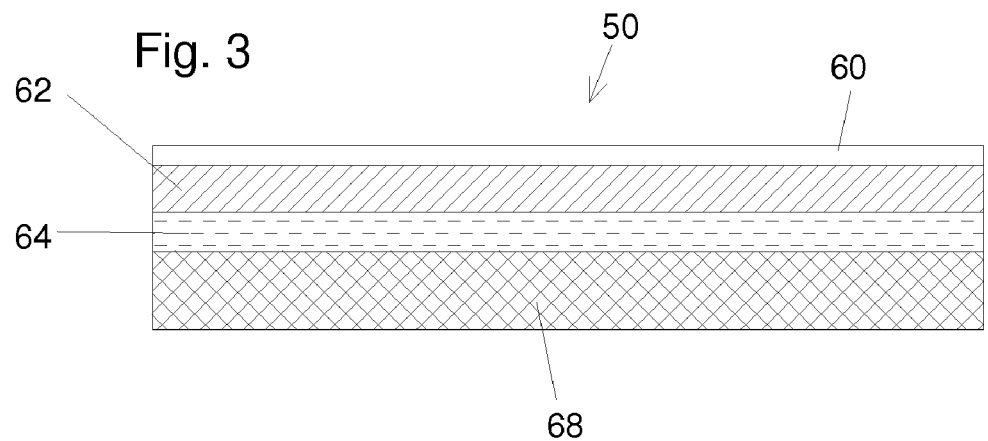
FIG. 3 is a schematic sectional elevational view of a third embodiment of an exterior surface covering according to the present invention.

A third embodiment of an exterior surface covering 50 according to the present invention is shown in the schematic sectional elevational view of FIG. 3. In this third embodiment the exterior surface covering 50 includes three layers 60, 62, 64. In this embodiment, an outer or first layer 60 serves as a protective topcoat and includes colorants having low or non-absorbing properties in the near infrared region. The exterior surface covering 50 also includes a middle or second layer 62 that has reflectance properties that change with changing temperature. Finally, the exterior surface covering 50 also includes an inner or third layer 64 that is highly reflective. In this case, the thermochromic effect color or reflectivity change of the second layer 62 is such that at high temperatures the second layer becomes transparent. This transparency then allows light from the near infrared spectrum passing through the first or outer layer 60 to pass also through the second layer 62 to be reflected away from the substrate 68 by the highly reflective third layer 64. In this way, at higher temperatures, the exterior surface structure 50 is more highly reflective of excess heat from the near infrared region of solar radiation.

A fourth embodiment of an exterior surface covering 70 according to the present invention is shown in the schematic sectional elevational view of FIG. 4. In this fourth embodiment the exterior surface covering 70 includes three layers 80, 82, 84 covering a substrate 88, as in the case of the third embodiment. In this fourth embodiment, an outer or first layer 70 is provided as a protective topcoat and also includes colorants having low or non-absorbing properties in the near infrared region. However, in this fourth embodiment of the exterior surface covering 70, the innermost or third layer 84 is highly absorptive. In this case, the thermochromic effect color or reflectivity change of the middle or second layer 82 is such that at low temperatures the second layer 82 becomes transparent. This transparency then allows light from the near infrared spectrum passing through the first or outer layer 80 to also pass through the second layer to be absorbed by the highly absorptive third layer 84. In this way, at lower temperatures, the exterior surface covering 70 is more highly absorptive of heat from the near infrared region of solar radiation and the exterior surface covering 70 can capture thermal energy. At higher temperatures, the exterior surface covering 70 is less absorptive. In some cases, it is advantageous to provide a second layer 82 that becomes reflective to infrared radiation at elevated temperatures.

The exterior surface covering of the present invention can be prepared by formulating coating compositions for use in forming layers with the desired optical characteristics. For example, in the case of the first embodiment of the present invention, a first coating composition can be formulated to include at least one suitable thermochromic pigment dispersed in a suitable first polymeric binder, and a second coating composition including a suitable colorant dispersed in a suitable second polymeric binder.

The polymeric binder employed for the first coating composition can be the same as or differ from the polymeric binder employed for the second coating composition. Preferably, the polymeric binder is selected to include a polymeric material having good exterior durability, such as a poly(meth)acrylate. In addition, it is preferred that the polymeric binder employed for the second coating composition have good transparency in the near infrared.

The polymeric binders employed can be solvent-based materials. However, water-based polymeric binders such as acrylic latex binders are preferred in the interest of reducing solvent emissions. When a water-based polymeric binder is employed, conventional coatings additives for water-based coatings compositions can be included, such as water, cosolvents, thickeners, rheology modifiers, agents for promoting film formation and coalescence, biocides, fungicides, fire retardant materials, and the like.

The exterior surface coating is formed by initially applying the first coating composition to the surface of the substrate by a suitable application means. The application means can employ conventional coatings application equipment, such as spray, roller, dip, curtain, or brush coating devices. Next, the first coating composition is cured to form an inner covering layer. The specific requirements of the curing process depend upon the components of the first coating composition. For example, when a water-based polymeric binder such as a water-based acrylic polymeric latex material is employed for preparing the first coating composition, the first coating composition can be sprayed on the surface of the substrate to a predetermined thickness. Cure is accomplished by simply permitting the first coating composition to progress through water loss, film formation, coalescence of the latex particles, etc.

Next, the second coating composition is applied over the surface of the inner covering layer by suitable application means. The second coating composition includes a polymeric binder having good transparency to near infrared radiation, such as poly(meth)acrylate materials. Preferably, the second coating composition also includes at least one ultraviolet absorbent material. The second coating composition preferably also includes at least one colorant for achieving a desired aesthetic effect. When a water-based acrylic polymeric latex material is employed to formulate the second coating composition, the second coating composition can be sprayed on the surface of the cured inner covering layer at a predetermined thickness, and permitted to cure by loss of water and film formation.

In the case of those embodiments of the present invention requiring three layers, each such layer can be formed from a corresponding coating composition. Each such corresponding coating composition can in turn be applied to the suitable surface by conventional coating techniques, and permitted to cure to form a corresponding exterior surface covering layer.

While the exterior surface covering of the present invention can be prepared by the successive application of suitable coating compositions to the substrate surface, other methods of forming the exterior surface covering can also be employed. For example, in the case of the first embodiment of the exterior surface coating of the present invention, the inner layer can be formed from a suitable first film material in which a thermochromic pigment is dispersed. Examples of film materials that can be used include acrylics, polyurethanes, vinyls, olefin polymers and copolymers, and fluorinated polymers. The outer layer can be formed from a suitable second film material in which a colorant has been dispersed, and the exterior surface covering can be formed by laminating the first film material to the second film material using a suitable lamination process which may include the use of a lamination adhesive. The exterior surface covering can be subsequently applied to the substrate surface by application of an adhesive coating to the substrate surface, followed by application of the exterior surface covering. In another aspect, an adhesive material can be applied to the interior surface of the exterior surface covering, and the interior surface then covered with a suitable release liner. When installing the exterior surface covering, the exterior surface covering is trimmed to match the substrate surface being covered, the release liner is removed from the back of the exterior surface covering, and the exterior surface covering is then applied in registration to the substrate surface. In the alternative, the exterior surface covering can be secured to the substrate surface mechanically, such as by fasteners.

In a further variation, the exterior surface covering is formed by applying a coating composition to a film forming at least one layer of the exterior surface covering. The coating composition is then cured to provide a second layer.

In another example, at least one layer of the exterior surface covering and the substrate are formed from a polymeric material and are formed simultaneously by a polymer forming process such as coextrusion. For example, when the exterior surface covering is being applied to building cladding such as polyvinyl chloride siding material, the PVC siding substrate and the inner layer of the exterior surface covering can be coextruded using conventional plastics extrusion equipment. The outer layer of the exterior surface covering can then be formed on the surface of the inner layer by applying a coating composition including the desired colorant material.

The colored topcoat can not only provide aesthetically desirable colors, but also provide weatherability and UV protection for the underlying layer(s). Since the topcoat has high transparency in the near infrared range of solar radiation, the solar heat absorption of the exterior surface covering can be controlled by the underlying portion of the covering. Hence, the color of the exterior surface covering can remain within a desired predetermined range or band, or even the same, even if the inner layer changes its color in order to optimize solar absorption.

Suitable topcoats can be prepared by using the colorants that have high transparency to near infrared radiation. Examples of such colorants include, but are not limited to, pearlescent pigments, lamellar effect pigments, metal/metal oxide coated mica or glass particles, organic pigments, perylene pigments, ultramarine blue pigments, or nano-pigments.

The inner layer preferably has solar reflectance that varies in response to changes in surrounding temperatures or other environmental stimuli during heating/cooling seasons.

Material properties that can provide such reversible changes in solar reflectance may include, but are not limited to, thermochromism, photochromism, electrochromism, solvatochromism, ionochromism, halochromism, crystalline polymorphism or changes in refractive indices.

Examples of such systems comprise thermochromatic colorants, thermochromatic polymers, composite thermochromatic pigments, chromogenic thermotropic gels, vanadium oxides, polythiophene polymers, liquid crystals, spirobenyopyrans, spironaphthoxazines, chromenes, fulgides, diarylethenes, or electrochromic chemicals. Depending on their chemical reactivity, thermochromic materials can either be added directly to a coating composition, or first microencapsulated before addition in order to chemically isolate the thermochromic material from other components of the coating composition. Techniques for microencapsulating target materials are well known in the art. U.S. Patent Application Publication No. 2005/0064175 discloses intrinsically thermochromic materials including spirooxazines, stereoisomorphic compounds such as biathrylidenes including bianthrones, bithioanthylidenes, and dixanthylidenes, polythiophenes, polysilanes, and poly diacetylenes, photochromic materials which require auxiliary materials such as temperature-sensitive UV blocking agents to achieve thermochromism, including spironaphthoxazines, benzopyrans, naphthopyrans, fulgides, diarylethenes, dihydroindolizines, dithiophenylperfluorocyclopentenes, and spirobenzopyrans; ioniochromic materials such as phthalides such as phthaleins including phenylphthalein, crystal violet lactone, and pyridyl blue, leucotriarylmethanes, azo dyes, styryl dyes, chelates including dimethylgyloxime, 1,2-dihydrobenzenes, 1-hydroxyanthraquinones, crown ethers, mono- and di-vinylphthalides including monovinylphthalides, diarylphthalides, fluorenes, fluorans, lactams, and sulfones.

In some embodiments of the present invention, the inner portion of the covering can include a bottom layer of reflective material, such as white coating or metal/metallized layer, and an upper layer that changes from opaque to transparent by the stimuli of outdoor environments such as temperature.

The exterior surface coverings of the present invention for optimizing surface solar reflectance and energy efficiency of a building assembly can be directly applied to the existing exterior envelope through typical coating application methods, or they can be part of the claddings that are applied to the exterior envelope separately.

Depending on the coverage of the top or outermost layer, there could be some lightening, or darkening detectable in the color that could be overcome by highly efficient top covering surface coverage.

In some embodiments the binders making up the construction could include inorganic coating materials, such as silicas, silicates, phosphates, titanates, zirconates, aluminosilicates, and the like. Hybrid organic/inorganic binders such as ceramic binders may also be used.

Such a surface could also be a part of individual roofing granules in place of, at least in part, those used in surfacing of asphalt composition roofing shingles. Also, such layer compositions or constructions may be used in the surface of interior wall or articles that can provide further energy saving by optimizing the solar heat absorption.

Such constructions could be assembled by processes including coating, extrusion, coextrusion, lamination, or other processes known in the art of producing layered structures. Further examples of application for this invention will become evident to those who are skilled in the art.

EXAMPLE

Roofing granules are first coated with an inner coating composition including a thermochromic pigment that changes color from white to black as temperature drops from T1 to T2. The inner coating composition is then cured. A second or outer coating composition is applied over the cured inner layer, and the outer coating composition is cured to provide an outer layer than is transparent to near infrared radiation. The infrared reflectivity of the roofing granules is will be reduced from R1 to R2 as the temperature drops from T1 to T2. So, while the granules reflect more heat in summer time, they will absorb more heat in winter.

Various modifications can be made in the details of the various embodiments of the processes and articles of the present invention, all within the scope and spirit of the invention and defined by the appended claims.

The invention claimed is:

1. An exterior surface covering comprising:
    (a) an outer colored layer having a transmission coefficient of at least 50 percent for electromagnetic radiation in the wavelength range from 700 nanometers to 2500 nanometers;
    (b) a middle layer having a transmission coefficient for electromagnetic radiation in the wavelength range from 700 nanometers to 2500 nanometers, the transmission coefficient being dependent on a variable parameter, the transmission coefficient varying by a factor of at least 0.5 as the parameter is varied over a predetermined range; and
    (c) an inner layer having a reflectance of at least 40 percent for electromagnetic radiation in the wavelength range from 700 nanometers to 2500 nanometers.

2. An exterior surface covering according to claim 1 wherein the transmission coefficient of the middle layer increases with an increase in the parameter over the predetermined range of the parameter.

3. An exterior surface covering according to claim 2 wherein the variable parameter is temperature.

4. An exterior surface covering according to claim 3 wherein the middle layer comprises at least one thermochromic substance selected from the group consisting of thermochromatic colorants, thermochromatic polymers, composite thermochromatic pigments, chromogenic thermotropic gels, vanadium oxides, polythiophene polymers, liquid crystals, spirobenzopyrans, spironaphthoxazines, chromenes, fulgides, and diarylethenes.

5. An exterior surface covering according to claim 2 wherein the transmission coefficient of the middle layer varies from less than 0.4 to greater than 0.5 when the temperature varies from less than 20° C. to greater than 30° C.

6. An exterior surface covering comprising:
    (a) an outer colored layer having a transmission coefficient of at least 50 percent for electromagnetic radiation in the wavelength range from 700 nanometers to 2500 nanometers;
    (b) a middle layer having a transmission coefficient for electromagnetic radiation in the wavelength range from 700 nanometers to 2500 nanometers, the transmission coefficient being dependent on a variable parameter, the transmission coefficient varying by a factor of at least 0.5 as the parameter is varied over a predetermined range; and
    (c) an inner layer having an absorption coefficient at least 60 percent for electromagnetic radiation in the wavelength range from 700 nanometers to 2500 nanometers.

* * * * *